(12) United States Patent
Carlson et al.

(10) Patent No.: US 11,324,378 B2
(45) Date of Patent: May 10, 2022

(54) FOLDABLE MULTI-PURPOSE NONWOVEN HAND PAD AND METHOD OF USE

(71) Applicant: 3M INNOVATIVE PROPERTIES COMPANY, St. Paul, MN (US)

(72) Inventors: Lauren K. Carlson, Saint Paul, MN (US); James P. Gardner, Jr., Stillwater, MN (US); Mark D. Hunter, Woodbury, MN (US); Robert J. Maki, Hudson, WI (US); James P. Endle, New Richmond, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 129 days.

(21) Appl. No.: 16/093,428

(22) PCT Filed: Apr. 6, 2017

(86) PCT No.: PCT/US2017/026270
§ 371 (c)(1),
(2) Date: Oct. 12, 2018

(87) PCT Pub. No.: WO2017/180413
PCT Pub. Date: Oct. 19, 2017

(65) Prior Publication Data
US 2019/0104918 A1    Apr. 11, 2019

Related U.S. Application Data

(60) Provisional application No. 62/321,458, filed on Apr. 12, 2016.

(51) Int. Cl.
*A47L 13/16*    (2006.01)
*A47L 13/10*    (2006.01)
(Continued)

(52) U.S. Cl.
CPC .............. *A47L 13/16* (2013.01); *A47L 13/10* (2013.01); *A47L 17/08* (2013.01); *B32B 5/022* (2013.01);
(Continued)

(58) Field of Classification Search
CPC ......... A47L 17/08; A47L 13/16; B32B 5/022; B32B 5/245; B32B 5/26; B32B 5/18;
(Continued)

(56) References Cited

U.S. PATENT DOCUMENTS 4,027,352 A    6/1977   Wagner
5,140,785 A *   8/1992   Eleouet ................... A47L 13/16
                                                                       15/118
(Continued)

FOREIGN PATENT DOCUMENTS

DE    202017107847 U1 *   1/2018   ............. A47L 13/16
FR          2723525 A1 *   2/1996   ............. A47L 13/16
(Continued)

OTHER PUBLICATIONS

Computer generated English translation of FR 2723525, Johnson et al., Feb. 1996. (Year: 1996).*
(Continued)

*Primary Examiner* — Laura C Guidotti
(74) *Attorney, Agent, or Firm* — Vincent Pham

(57) ABSTRACT

A nonwoven hand pad includes a substrate having first and second opposed major surfaces wherein the first major surface includes a first functional region configured for a first cleaning operation, and the second major surface includes at least two functional regions configured for second and third cleaning operations. A method of cleaning using such a pad is also disclosed.

15 Claims, 1 Drawing Sheet

(51) Int. Cl.
*A47L 17/08* (2006.01)
*B32B 5/02* (2006.01)
*B32B 5/18* (2006.01)
*B32B 5/26* (2006.01)
*D04H 1/4374* (2012.01)
*B32B 5/24* (2006.01)
*B32B 7/12* (2006.01)
*D06M 23/08* (2006.01)

(52) U.S. Cl.
CPC ............... *B32B 5/18* (2013.01); *B32B 5/245* (2013.01); *B32B 5/26* (2013.01); *B32B 7/12* (2013.01); *D04H 1/4374* (2013.01); *B32B 2250/20* (2013.01); *B32B 2255/02* (2013.01); *B32B 2255/20* (2013.01); *B32B 2307/538* (2013.01); *B32B 2432/00* (2013.01); *D06M 23/08* (2013.01); *D10B 2503/00* (2013.01)

(58) Field of Classification Search
CPC ............ B32B 2250/02; B32B 2250/20; B32B 2307/538; B32B 2432/00; A47K 7/02
USPC ..................................... 15/244.1, 229.11, 118
See application file for complete search history.

(56) References Cited

U.S. PATENT DOCUMENTS

| | | | |
|---|---|---|---|
| 6,192,543 B1 | 2/2001 | Lee | |
| 7,310,847 B2 * | 12/2007 | Bolkan | .................. A47L 13/16 15/104.94 |
| 9,015,895 B2 * | 4/2015 | Filho | ......................... B08B 3/04 15/227 |
| 2003/0135181 A1 | 7/2003 | Chen | |
| 2004/0040107 A1 | 3/2004 | Bolkan | |
| 2004/0093679 A1 * | 5/2004 | Kukoff | .................... A47L 13/16 15/118 |
| 2007/0079462 A1 | 4/2007 | Haskett | |
| 2009/0106920 A1 | 4/2009 | Wahi | |
| 2009/0276971 A1 | 11/2009 | Nozari | |
| 2012/0227203 A1 | 9/2012 | Ouellette | |
| 2013/0091648 A1 * | 4/2013 | Frigo, Jr. | ................ A47L 13/12 15/118 |
| 2013/0337714 A1 | 12/2013 | Shah | |

FOREIGN PATENT DOCUMENTS

| | | |
|---|---|---|
| JP | 55-139844 | 11/1980 |
| JP | 2005-066324 | 7/2004 |
| JP | 2015-080655 | 4/2015 |
| WO | WO 90-00105 | 1/1990 |
| WO | WO 2000-64326 | 11/2000 |
| WO | WO 2011-056632 | 5/2011 |
| WO | WO 2015-123635 | 8/2015 |

OTHER PUBLICATIONS

International Search Report for PCT International Application No. PCT/US2017/026270, dated Jul. 13, 2017, 3 pages.

* cited by examiner

FOLDABLE MULTI-PURPOSE NONWOVEN HAND PAD AND METHOD OF USE

CROSS REFERENCE TO RELATED APPLICATIONS

This application is a national stage filing under 35 U.S.C. 371 of PCT/US2017/026270, filed Apr. 6, 2017, which claims the benefit of Provisional Application No. 62/321,458, filed Apr. 12, 2016, the disclosure of which is incorporated by reference in their entirety herein.

BACKGROUND

The present invention relates generally to hand pads used for cleaning, scrubbing and scouring soiled surfaces. Hand pads are often used in commercial, institutional, and consumer applications to clean a variety of surfaces including, for example, cooking surfaces, countertops, cooking utensils, pots and pans, grills, sinks, bathtubs, showers, etc.

Hand pads are known in the prior art. U.S. Patent Publication 2009/0106920 (Wahi) discloses pads used for both cleaning and scouring. The pad has one or more usable faces and may have one or more unusable faces. Alternatively, all faces of the pad may be usable. The pad is sized conveniently to fit into the palm of a person's hand. The usable faces are also sized to enable manual washing of dishes, scouring of pots and pans, and cleaning of surfaces. Each usable face comprises a plurality of diverse materials. At least one of these materials is sponge-like, and at least one of these materials is suitable for use in scrubbing or scouring. However, all of these materials are on the same usable face. The user does not have to turn the pad over to access one material in place of another. All washing, cleaning, scrubbing, and scouring may be accomplished from contact with a single face of the pad.

U.S. Pat. No. 6,192,543 (Lee) discloses a cleaning mitt that provides a mild cleaning surface and a more abrasive cleaning surface. Water-absorbent material is preferably provided with these surfaces to hold water and cleanser during use. The mitt is particularly well suited for cleaning automobiles and the more abrasive cleaning surface is preferably designed to remove stubborn debris such as tar and dried bugs without damaging the finish of the automobile.

SUMMARY

Dual purpose hand pads including a sponge material are known in the art. Such products typically consist of a sponge to which a nonwoven scouring web has been laminated to one or both sides. As such, these products may provide a dual function in terms of cleaning because each side can be used for a different cleaning action (e.g. scouring and wiping, or light scouring and heavy scouring, etc). Such products are commercially available. One example is Scotch-Brite 74 product, a medium duty abrasive web laminated to a cellulose sponge body available from 3M Company, St. Paul, Minn. The nonwoven web side of the product is used for medium scouring and the reverse exposed sponge side is used for wiping or absorbing liquids.

The need exists for a cleaning pad that is durable, versatile, and easy to make and use. More particularly, the need exists for a hand pad having at least three different functional surfaces that is easy to use and can be made in an economical manner. The three functional surfaces may provide for example, two scouring levels on the same or opposed surfaces of the pad, and a third surface that provides a non-scouring surface for wiping or absorbing liquids.

In one embodiment, the present invention provides a hand pad comprising a nonwoven substrate having first and second opposed major surfaces, wherein the first major surface includes a first functional region configured for a first cleaning operation, and the second major surface includes at least two functional regions configured for second and third cleaning operations. The second functional region may define a scouring surface providing a first level of scouring, and the third functional region may define a scouring surface providing a second level of scouring.

In one embodiment, the second functional region may comprise a continuous abrasive surface, and the third functional region may comprise a discontinuous abrasive surface. The discontinuous abrasive surface may comprises an array of spaced-apart scouring bodies arranged in a pattern.

In a specific embodiment, the second functional region may comprise a first array of spaced-apart scouring bodies arranged in a first pattern, and the third functional region may comprise a second array of spaced-apart scouring bodies arranged in a second pattern.

In another embodiment, the first major surface may be substantially free of abrasive particles.

In another embodiment, nonwoven hand pad comprises a nonwoven backing layer. The nonwoven backing layer may comprise at least one of a foam material and a fibrous nonwoven material. In more specific embodiments, the nonwoven backing layer may comprise an absorbent sponge material, such as a cellulosic material or a urethane foam material. In one embodiment, the backing layer may be laminated to the substrate.

In another embodiment, the hand pad may comprise first and second nonwoven materials laminated to the backing layer. In a specific aspect, the first and second nonwoven materials may overlay the entirely of the backing layer second major surface. The first nonwoven material may be an open lofty fibrous nonwoven material having a continuous abrasive surface, and the second nonwoven material may be a monolithic fibrous nonwoven material having a semi-densified layer with a first array of spaced-apart scouring bodies arranged in a first pattern on the semi-densified surface layer. In a more specific aspect, the first nonwoven material may comprise a homogeneous unitary nonwoven material.

In a more specific embodiment, the entirety of the backing layer first major surface comprises a sponge material free of abrasive particles. In an even more specific embodiment, the entirety of the backing layer second major surface is provided with scouring material. In another aspect, no sponge material is provided on the backing layer second major surface.

In another embodiment, the hand pad may be symmetric. In a more specific embodiment, the hand pad may include first and second portions that are mirror images foldable along a line of symmetry. That is, the first and second portions may have the same size and shape. In addition, the hand pad may have a length of from about 8 inches to about 12 inches, a width of from about 4 inches to about 8 inches, and a thickness of no greater than about ½ inches. In one aspect, when the hand pad is folded, at least one of the first, second and third functional regions may be concealed. In a more specific aspect, when the hand pad is folded, a pair of functional regions or working surfaces provided on the same major surface may face in opposite directions. In other aspects, the first and second opposed major surfaces may be generally planar, and/or the first and second opposed major surfaces may be coplanar.

In various aspects, the hand pad may comprise abrasive particles on at least one of the first and second major surfaces, the nonwoven substrate and/or backing layer may comprise a resiliently compressible material, the nonwoven substrate and/or backing layer may comprise foam materials (e.g. cellulosic and/or polymeric sponge materials), the nonwoven substrate and/or backing layer may comprise a fibrous material, the fibrous nonwoven material may comprise an open lofty material, the nonwoven substrate and/or backing layer may comprise a porous material, the abrasive particles may be provided throughout the nonwoven substrate, the hand pad may have a thickness of at least about 3 millimeters and no greater than about 30 millimeters, the hand pad may have at least 5 vertices, the shape of the hand pad may be symmetric, asymmetric, regular or irregular, the hand pad may be configured to be nestable, the first and second opposed major surfaces may be in the shape of regular hexagon, the hand pad may comprise two portions joined along a fold line that defines a line of symmetry, at least one of the first and second major surfaces may have a surface area of at least about 8 square inches (in$^2$) and no greater than about 25 square inches (in$^2$), the ratio of the longest dimension of the hand pad to the thickness of the hand pad may be at least about 7 and no greater than about 75, the hand pad may comprise a monolithic nonwoven web, the monolithic nonwoven web may comprise a semi-densified fibrous layer that is integral with the monolithic nonwoven web, and/or the first major surface of the monolithic nonwoven pad may comprise a first array of spaced-apart scouring bodies.

In another aspect, the present invention provides a method of scouring a soiled surface using any of the embodiments described herein. In one embodiment, the method comprises the step of folding the hand pad back onto itself in overlapping relation such that two working surfaces that were adjacent to each other are now on opposite sides of the folded pad, manually bringing the first major surface of the hand pad into contact with the soiled surface, and manually moving the hand pad about the soiled surface while maintaining one of the working surfaces of the hand pad in contact with the soiled surface. In another aspect, the method may further include the step of flipping the folded hand pad over such that the working surface previously in contact with the soiled surface now faces away from the soiled surface and the opposed working surface is in contact with the soiled surface, and manually moving the hand pad about the soiled surface while maintaining the hand pad in contact with the soiled surface. In another aspect, the method may further include the step of unfolding the hand pad to expose the inner surface that was previously arranged between the two working surfaces, contacting the soiled surface with what had been the inner surface of the folded hand pad, and manually moving the hand pad about the soiled surface while maintaining the hand pad in contact with the soiled surface.

Advantages of certain embodiments of the present invention include that it provides a hand pad that is durable, versatile, easy to make and use, and has at least three distinct working surfaces adapted for different cleaning and scouring operations.

DETAILED DESCRIPTION

Figure 1:
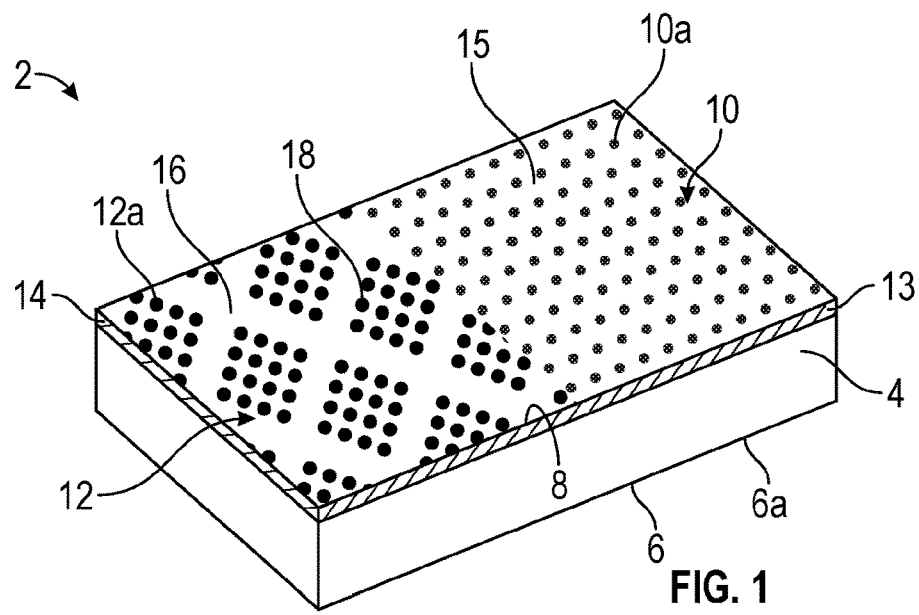
FIG. 1 is a perspective view of a nonwoven hand pad according to an embodiment of the invention.

Referring to the drawings, FIG. 1 shows a tri-functional or triple action nonwoven laminate hand pad 2 according to an embodiment of the invention. The hand pad 2 includes a nonwoven backing layer 4 having a first major surface 6 (i.e. the bottom or downwardly facing surface of which only the edge is visible) and an opposed second major surface 8 (i.e. the top or upwardly facing surface of which only the edge is shown). The nonwoven backing layer 4 may be, for example, a fibrous nonwoven web or a foam or sponge-like nonwoven material. A first scouring material 10 having a first set of scouring characteristics is provided on a first region of the backing layer 4 second major surface 8, and a second scouring material 12 having a second set of scouring characteristics different from the scouring characteristics of the first scouring material 10 is provided on a second region of the backing layer 4 second major surface 8. Configured in this manner, the first major surface 6 defines a first functional working surface 6a, the first scouring material 10 defines a second functional working surface 10a, and the second scouring material 12 defines a third functional working surface 12a. Thus, the hand pad 2 has three distinct surfaces regions 6a, 10a, 12a each of which provide a unique function.

The first and second scouring materials 10, 12 have different constructions that provide different functions. For example, the first scouring material 10 may be an open lofty fibrous nonwoven 13 having abrasive 15 distributed generally continuously and uniformly on at least the exposed outer surface of the nonwoven material, thereby defining a first scouring surface, and the second scouring material 12 may comprise a monolithic fibrous nonwoven substrate 14 comprising a semi-densified layer 16 and an abrasive material 18 provided on discrete regions of the semi-densified layer, thereby defining a second scouring surface. Thus, the first and second scouring materials 10, 12 differ both structurally and functionally from each other and have scouring surfaces 10a, 12a that differ both structurally and functionally.

In the illustrated embodiment, the first major surface 6 may provide an exposed sponge material (e.g. polyurethane or cellulose) with no abrasive treatment, thereby providing a non-scratch cleaning surface 6a that is useful for light duty scrubbing or wiping and can absorb liquids or carry soapy water to a surface for cleaning a surface. The second functional working surface 10a may provide a uniformly coated abrasive surface suitable for all-purpose scouring that will remove contaminants such as food soil or fine layers of grease from a surface. And the third functional working surface 12a may be a nonwoven web having discrete printed features that include abrasive particles, wherein the printed abrasive features provide a skiving action that is more aggressive than the all-purpose scouring action of the second functional surface 10a.

In a specific embodiment, the first scouring material 10 may be, for example, an abrasive nonwoven web such as Scotch-Brite 96 medium duty scouring web available from 3M Company, St. Paul, Minn. Such a nonwoven abrasive web includes a continuous abrasive treatment provided over the entirety of the web. Such an abrasive material may be coated (e.g. sprayed or roll coated) onto the nonwoven web.

The second scouring material 12 may be, for example, a nonwoven abrasive having a construction similar to that described in PCT Publication WO2015/123635 (Engle et al.), the entire contents of which are hereby incorporated by reference. In the illustrated embodiment, the first and second scouring materials 10, 12, are laminated to the nonwoven backing layer 4 second major surface 8. By laminating the first and second scouring materials 10, 12 to the nonwoven backing layer 4 second major surface 8, the surface area between the first and second scouring materials 10, 12 and the nonwoven backing layer 4 second major surface 8 is maximized. This serves to form a robust and secure attachment between the first and second scouring materials 10, 12 and the backing layer 4.

In the illustrated embodiment, the second functional working surface 10a and the third functional working surface 12a are generally planar and coplanar. That is, the first scouring web material 10 and the second scouring web material 12 have similar thicknesses such that the second and third functional working surfaces 10a, 12a are generally aligned. In addition, in the illustrated embodiment, the second functional working surface 10a and the third functional working surface 12a are contiguous and cover the entirety of the backing layer 4 second major surface 8. The second functional working surface 10a and the third functional working surface 12a are designed to be substantially coplanar such that the level of the surfaces is similar so that the edges and seams between the second functional working surface 10a and the third functional working surface 12a are less pronounced. This, in turn, reduces the likelihood of having the edges or seams catch or snag on rough or jagged surface features that can interfere with the use of the hand pad or lead to premature separation of working surfaces 10a, 12a from the backing layer 4.

By providing three different functional working surfaces on one cleaning pad, a user is able to perform three different scouring jobs without switching pads. The need for multiple cleaning/scouring actions for a given task is common in commercial kitchens where a wide range of items must be cleaned including cooking surfaces, food preparation surfaces, pots and pans, steam table trays, ceramic dishes, glassware, utensils, etc. Thus, having a single, multi-functional cleaning/scouring pad is advantageous for a number of reasons including, the individual responsible for purchasing pads can order and store a single SKU, the user has different scouring functions available at their immediate disposal, and the risk of misplacing different types of pads and/or the risk of using the wrong type of pad is minimized.

Figure 2:
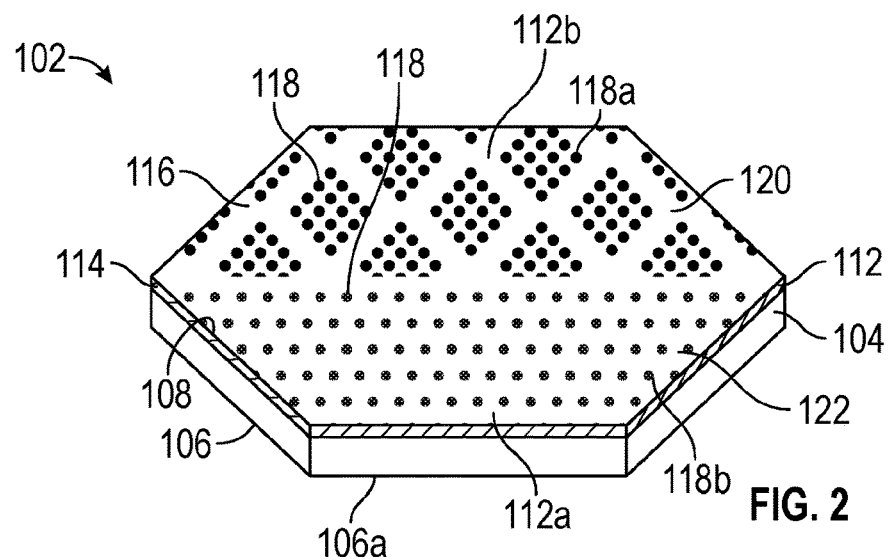
FIG. 2 is a perspective view of a nonwoven hand pad according to a second embodiment of the invention.

Referring now to FIG. 2, there is shown a tri-functional nonwoven laminate hand pad 102 according to another embodiment of the invention. The hand pad 102 includes a nonwoven backing layer 104 having a first major surface 106 and an opposed second major surface 108, and a nonwoven scouring web 112 provided on the second major surface 108. The nonwoven scouring web 112 is similar to the hand pad 12 described in reference to FIG. 1 and comprises a monolithic fibrous nonwoven substrate 114 comprising a semi-densified layer 116 and an abrasive material 118 on discrete regions of the semi-densified layer 116. Thus, the embodiment illustrated in FIG. 2 differs from the embodiment shown in FIG. 1 in that the first scouring material 10 has been eliminated. That is, instead of having separate and distinct first and second scouring materials 10, 12 as in the embodiment of FIG. 1, the hand pad 102 of FIG. 2 includes a single nonwoven substrate 114 provided on the hand pad 102 second major surface 108. In addition, the nonwoven substrate 114 includes a semi-densified layer 116 with two different printed patterns 118a, 118b. That is, the nonwoven hand pad 112 includes a first region 120 having functional material printed on the densified layer 116 in a first pattern 118a, and a second region 122 having functional material printed in a second pattern 118b. In this manner, the printed patterns 118a, 118b can be designed to provide two different scouring actions on the same major surface of the hand pad 102. Thus, the hand pad 102 comprises a first functional working surface 106a, a second functional surface 112a, and a third functional surface 112b, each with distinct cleaning/scouring properties and characteristics.

Figure 3:
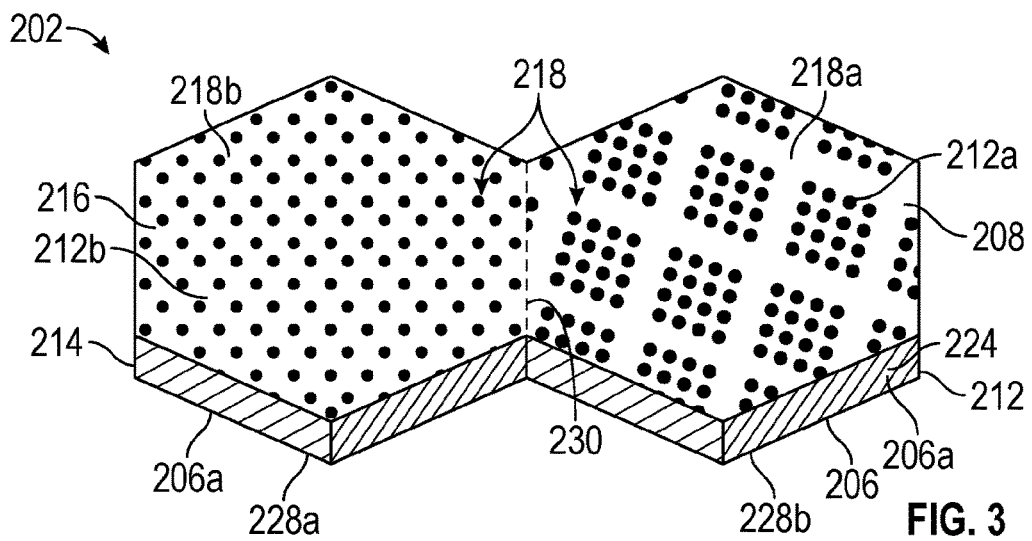
FIG. 3 is a perspective view of a nonwoven hand pad according to a third embodiment of the invention.

Referring now to FIG. 3, there is shown a tri-functional nonwoven laminate hand pad 202 according to another embodiment of the invention. The hand pad 202 comprises a fibrous nonwoven scouring web 212 having a first major surface 206, which defines a first functional surface 206a, and an opposed second major surface 208. The nonwoven scouring web 212 comprises a monolithic fibrous nonwoven substrate 214 comprising a semi-densified layer 216 and abrasive material 218 printed on discrete regions of the semi-densified layer 216 in two different patterns 218a, 218b, which define second and third functional working surfaces 212a, 212b respectively. Thus, in one aspect, the embodiment depicted in FIG. 3 differs from the embodiment illustrated in FIG. 2 in that the nonwoven backing layer 204 has been eliminated.

In addition, in the embodiment shown in FIG. 3, the hand pad 202 is configured to allow it to be readily folded, thereby allowing the different printed abrasive patterns 218a, 218b to be arranged on opposite sides of the folded pad 202, such that the different printed abrasive patterns 218a, 218b are isolated and may be used independently. More particularly, in the embodiment illustrated in FIG. 3 the pad 202 is configured so that it can be folded in half such that a region with one pattern (e.g. 218a) forms one major surface of the folded pad 202, and the other pattern (e.g. 218b) forms an opposed major surface of the folded pad 202.

In the illustrated embodiment, the pad 202 is symmetric and includes first and second portions 228a, 228b that connect along a fold line 230. There the first and second portions 228a, 228b neck down and connect along the fold line 230, thereby providing the user with an intuitive visual indicator for where to fold the pad 202. Further, in the illustrated embodiment, the fold line 230 forms a line of symmetry such that the first and second portion 228a, 228b are mirror images of each other. Thus, the size and shape of the pad 202 is such that when the pad 202 is folded onto itself in overlapping relation along the fold line 230, the first and second portions 228a, 228b overlap and generally coincide, thereby forming a pad having a thickness equal to the combined thickness of the first and second portion 228a, 228 and a perimeter that generally corresponds to the perimeter of either the first portion 228a or the second portion 228b. By folding the pad 202, the two scouring surfaces 218a, 218b form opposed major surfaces of the folded pad 202. When a user wishes to use the first functional working surface 206a, which is sandwiched between the first and second portions 228a, 228b of the folded pad 202, the pad 202 can simply be unfolded, thereby exposing the first functional working surface 206a. In one embodiment, the first functional surface 206a may be, for example, a fibrous nonwoven surface free of abrasive, thereby forming a non-scratch scouring surface.

In any of the embodiments described herein, the nonwoven backing layer and/or substrate may be formed from a variety of commonly available materials including, for example, fibrous nonwoven webs, sponge materials, such as natural or cellulosic sponge materials, or foam materials such as polyurethane foam. In some embodiments, the nonwoven backing layer and/or substrate may be formed of a porous sponge-like material or a resiliently compressible fibrous nonwoven material. In other embodiments, the nonwoven backing layer and/or substrate may be formed of a homogeneous material, a homogeneous mixture of two or more materials, or multiple layers of the same or different materials. The particular material is not critical so long as it provides sufficient strength for handling during processing and sufficient strength to be used for the intended end use application.

In more specific embodiments, the foam materials may be, for example, open-cell foam, closed-cell foam, and reticulated foam. Such foam materials may be made from synthetic polymer materials, such as polyurethanes, foam rubbers, and silicones, and natural sponge materials.

In some embodiments, the nonwoven backing layer and/or substrate may be formed of, for example, an open, low density, three-dimensional, non-woven web of fibers, wherein the fibers are bonded to one another at points of mutual contact. Such nonwoven fibrous web materials are often referred to as open, lofty, or low density fibrous nonwoven webs. Such fibrous nonwoven web materials typically exhibit a void volume (i.e. percentage of total volume of voids to total volume occupied by the non-woven web structure) of at least 75%, or at least 80%, or at least 85%, or in the range of from 85% to at least 95%. Such fibrous non-woven webs may be made of air-laid, carded, stitch-bonded, thermobonded and/or resin-bonded constructions of fibers, as known by those skilled in the art. Fibers suitable for use in non-woven substrate materials include natural and synthetic fibers, and mixtures thereof.

A suitable substrate is described in PCT Publication WO 2015/123635 (Endle et al), the entire contents of which are hereby incorporated by reference. WO 2015/123635 describes a monolithic nonwoven pad comprising at least some nonwoven fibers that are bonded to each other by fiber-fiber melt-bonding. "Monolithic" as used herein means a web having a composition (i.e., in terms of the percentage of fibers of various compositions that are present) at least substantially the same throughout the thickness of the web, including its major surfaces. It does not preclude the collective density at which such fibers are present from differing throughout the thickness of web. Monolithic does not encompass webs that are formed by laminating or otherwise attaching one nonwoven web to another, even if such webs might be of similar or identical composition.

In some embodiments, the substrate may be a monolithic nonwoven web comprising a first semi-densified fibrous layer that is integral with the monolithic nonwoven web and comprises an outward major surface that provides a first major surface of the monolithic nonwoven web.

In some embodiments, the first major surface of the monolithic nonwoven web comprises a first array of spaced-apart scouring bodies, and at least selected scouring bodies of the first array each comprise an inward portion that penetrates at least partially into the first semi-densified fibrous layer of the monolithic nonwoven web, and an outward portion that protrudes outward beyond the first major surface of the monolithic nonwoven web.

Commercially available non-woven substrate or web materials are available under the trade designation "Scotch-Brite™ General Purpose Scour Pad No. 96," "Scotch-Brite™ Heavy Duty Griddle Cleaner No. 82 (non-woven glass cloth)," "Scotch-Brite™ All Purpose Scour Pad No. 9488R," "Scotch-Brite™ Heavy Duty Scour Pad No. 86," all available from 3M Company, St. Paul, Minn.

The backing layer and/or substrate material may be continuous, meaning the backing layer and/or substrate contains no openings, holes, voids, or channels extending therethrough in the Z direction (i.e. the thickness or height dimension of the backing layer and/or substrate) that are larger than the randomly formed spaces in the material itself when the backing layer and/or substrate is made. Alternatively, the backing layer and/or substrate may be substantially continuous, meaning the backing layer and/or substrate may contain either very few or very small openings extending therethrough in the Z direction that are larger than the randomly formed spaces in the material itself when the backing layer and/or substrate is made, which openings do not significantly affect the durability of the backing layer and/or substrate.

In general, a wide variety of abrasive particles may be used with the embodiments described herein. Suitable abrasive particles include, for example, fused aluminum oxide, heat treated aluminum oxide, alumina-based ceramics, silicon carbide, zirconia, alumina-zirconia, garnet, diamond, ceria, cubic boron nitride, ground glass, quartz, titanium diboride, sol gel abrasives, plastics, talc, silica, calcium carbonate, limestone, chalk, pumice, nepheline syenite, and combinations thereof. The abrasive particles can be either shaped (e.g., rod, triangle, or pyramid) or unshaped (i.e., irregular). The term "abrasive particle" encompasses abrasive grains, agglomerates, or multi-grain abrasive granules.

With respect to the first scouring web 10, abrasive particles are generally uniformly applied to the web 10. With respect to the second scouring web 12, the abrasive particles are provided non-uniformly or in regular or irregular patterns. More particularly, abrasive particles may be provided in an array of spaced apart scouring bodies. The scouring bodies may be disposed on the semi-densified major surface 16 of the hand pad 2 in any suitable manner and in virtually any desired pattern.

In general, any make coat resin may be used to adhere the abrasive particles to any of the nonwoven webs. A preferred make coat is a phenolic resin. The make coat may be coated onto the nonwoven web using any conventional technique, such as knife coating, spray coating, roll coating, rotogravure coating, curtain coating, and the like. Abrasive surfaces of the hand pads described herein may also include an optional size coat over the abrasive particles.

A non-limiting list of suitable binder precursors includes e.g. acrylic resin, phenolic resin, nitrile resin, ethylene vinyl acetate resin, polyurethane resin, polyurea or urea-formaldehyde resin, isocyanate resin, styrene-butadiene resin, styrene-acrylic resins, vinyl acrylic resin, aminoplast resin, melamine resin, polyisoprene resin, epoxy resin, ethylenically unsaturated resin, and combinations thereof.

The make coat or the size coat or both can contain optional additives, such as fillers, fibers, lubricants, grinding aids, wetting agents, thickening agents, anti-loading agents, surfactants, pigments, dyes, coupling agents, photoinitiators, plasticizers, suspending agents, antistatic agents, and the like. Possible fillers include calcium oxide, calcium metasilicate, alumina trihydrate, cryolite, magnesia, kaolin, quartz, and glass. Fillers that can function as grinding aids include cryolite, potassium fluoroborate, feldspar, and sulfur. It will be recognized that some filler materials may also provide abrasive properties. The amounts of these materials are selected to provide the properties desired, as known to those skilled in the art.

It will be recognized that for some cleaning and scouring applications, the substrate materials themselves may provide the necessary function. For more intensive scouring applications, however, the nonwoven web will be provided with abrasive particles which may be dispersed generally uniformly throughout the web as shown and described in reference to, for example, the first scouring web 10 or the abrasive particles may be provided in scouring bodies as shown an described in reference to second scouring web 12.

In some embodiments, the hand pad has a minimum thickness of at least about 2 mm, at least about 3 mm, or at least about 4 mm, and has a maximum thickness of no greater than about 30 mm, no greater than about 20 mm, no greater than about 15 mm, or no greater than about 10 mm. The thickness of the hand pad is defined as the distance between an imaginary plane connecting the high points of the first major surface and an imaginary plane connecting the high points of the second major surface.

In addition, in some embodiments, the longest dimension of the hand pad 2 may be at least about 2 inches, at least about 3 inches, or at least about 4 inches, and no greater than about 16 inches, no greater than about 14 inches, or no greater than about 12 inches. In addition, in some embodiment, the hand pad 2 has a minimum plan view dimension of at least about 3 inches, at least about 4 inches, or at least about 5 inches.

In some embodiments, the perimeter of the hand pad may be rectangular or a regular polygon (i.e. all internal angles of the polygon are equal, and all sides have the same length). For example, the hand pad 102 shown in FIG. 2 is in the form of a regular hexagon, wherein the hexagon has six sides of equal length, six vertices, and six internal angles that are all equal to 120 degrees. Other suitable regular polygon shapes include pentagons, heptagons and octagons.

In some embodiments, the hand pad is designed to be nestable. That is, the size and shape of the hand pad is configured to fit together in close proximity with other hand pads without leaving any significant gaps or openings between the pads. Suitable nestable shapes may be symmetric or asymmetric, interlocking or non-interlocking. Configured in a nestable manner, hand pads can be produced efficiently from a continuous web with minimal waste. In addition, hand pads that have the same size and shape may be stacked neatly and efficiently for packaging, shipping and storage.

Persons of ordinary skill in the art may appreciate that various changes and modifications may be made to the invention described above without deviating from the inventive concept. For example, it will be recognized that each opposed major surface of the hand pad may include one or more functional working surfaces. That is, the first major surface may include two distinct regions having different cleaning and/or scouring properties, and the second major surface may also include two distinct regions having different cleaning and/or scouring properties. Thus, the scope of the present invention should not be limited to the structures described in this application, but only by the structures described by the language of the claims and the equivalents of those structures.

What is claimed is:

1. A nonwoven hand pad comprising a substrate having first and second opposed major surfaces, wherein the first major surface includes a first functional region configured for a first cleaning operation, and the second major surface includes at least two functional regions configured for second and third cleaning operations;
   wherein the second functional region defines a first scouring surface having a scouring function, and the third functional region defines a second scouring surface having a second scouring function,
   wherein the second functional region comprises a continuous abrasive surface and the third functional region comprises a discontinuous abrasive surface, and the third functional region comprises a second array of spaced-apart scouring bodies arranged in a pattern.

2. A nonwoven hand pad as defined in claim 1, wherein the first major surface is substantially free of abrasive particles.

3. A nonwoven hand pad as defined in claim 1, wherein the substrate comprises a first nonwoven material defining the first functional region.

4. A nonwoven hand pad as defined in claim 3, further comprising a nonwoven backing layer affixed to the first nonwoven material.

5. A nonwoven hand pad as defined in claim 4, wherein the nonwoven backing layer comprises at least one of a foam material and a fibrous nonwoven material.

6. A nonwoven hand pad as defined in claim 5, wherein the nonwoven backing layer comprises an absorbent sponge material.

7. A nonwoven hand pad as defined in claim 4, further comprising a second nonwoven material affixed to the backing layer.

8. A method of cleaning a soiled surface, comprising the step of manually folding the nonwoven hand pad of claim 1, bringing at least a portion of one of the first and second major surfaces of the hand pad into contact with the soiled surface, and manually moving the hand pad about the soiled surface while maintaining the first major surface of the hand pad in contact with the soiled surface.

9. A nonwoven hand pad comprising a monolithic substrate having first and second opposed major surfaces, wherein the first major surface includes a first functional region configured for a first cleaning operation, and the second major surface includes at least two functional regions configured for second and third cleaning operations;
   wherein the second functional region defines a first scouring surface having a scouring function, and the third functional region defines a second scouring surface having a second scouring function;
   wherein the second functional region comprises a first array of spaced-apart scouring bodies arranged in a first pattern, and the third functional region comprises a second array of spaced-apart scouring bodies arranged in a second pattern, wherein the first pattern is different than the second pattern in size or spacing of the spaced-apart scouring bodies,
   wherein the substrate comprises a first nonwoven material defining the first functional region;
   a nonwoven backing layer affixed to the first nonwoven material; and
   a second nonwoven material affixed to the backing layer, wherein the first nonwoven material is an open lofty fibrous nonwoven material having a continuous abrasive surface, and the second nonwoven material is a fibrous nonwoven material having a semi-densified layer with the first array of spaced-apart scouring bodies arranged in the first pattern on the semi-densified surface layer.

10. A nonwoven hand pad as defined in claim 9, wherein the first and second nonwoven materials includes planar working surfaces.

11. A nonwoven hand pad as defined in claim 10, further comprising abrasive particles on at least one of the first and second major surfaces.

12. A nonwoven hand pad as defined in claim 11, comprising a resiliently compressible, open, lofty, fibrous nonwoven material.

13. A hand pad as defined in claim 12, wherein the semi-densified layer of the nonwoven material is integral with the nonwoven material and comprises an outward major surface that provides the first major surface of the nonwoven material.

14. A hand pad as defined in claim 13, wherein the first major surface of the nonwoven web comprises a first array of spaced-apart scouring bodies, further wherein at least selected scouring bodies of the first array each comprise an inward portion that penetrates at least partially into the first semi-densified fibrous layer of the nonwoven web, and an outward portion that protrudes outward beyond the first major surface of the nonwoven web.

15. A nonwoven hand pad, comprising:
a foam backing layer having opposed first and second major surfaces, wherein the first major surface provides a first working surface that is substantially free of abrasive particles;
a first scouring material affixed to a portion of the backing layer second major surface comprising a fibrous nonwoven web and abrasive particles evenly distributed on an exposed surface of the web, thereby defining a first scouring surface, and
a second scouring material affixed to a portion of the backing layer adjacent the first scouring material comprising a nonwoven web having an exposed abrasive surface comprising a semi-densified surface layer with an array of discontinuous spaced apart scouring bodies provided thereon such that a material different than the material forming the scouring bodies is exposed between the scouring bodies, thereby defining a second scouring surface.

\* \* \* \* \*